United States Patent
Sickles

(10) Patent No.: US 12,454,018 B2
(45) Date of Patent: Oct. 28, 2025

(54) QUICK CLICK SAW ASSEMBLY

(71) Applicant: Ben Sickles, Eskasoni (CA)

(72) Inventor: Ben Sickles, Eskasoni (CA)

(73) Assignee: Quick Click Saw Jewelers Sawing Bench Pin, Eskasoni (CA)

( * ) Notice: Subject to any disclaimer, the term of this patent is extended or adjusted under 35 U.S.C. 154(b) by 420 days.

(21) Appl. No.: 18/131,960

(22) Filed: Apr. 7, 2023

(65) Prior Publication Data

US 2023/0321737 A1    Oct. 12, 2023

Related U.S. Application Data

(60) Provisional application No. 63/329,088, filed on Apr. 8, 2022.

(51) Int. Cl.
| | | |
|---|---|---|
| B23D 47/04 | (2006.01) | |
| A61K 38/00 | (2006.01) | |
| A61P 27/02 | (2006.01) | |
| C07K 14/47 | (2006.01) | |

(52) U.S. Cl.
CPC ............. B23D 47/04 (2013.01); A61P 27/02 (2018.01); C07K 14/4717 (2013.01); A61K 38/00 (2013.01)

(58) Field of Classification Search
CPC .. B23Q 9/0078; B23D 51/046; B23D 49/002; B23D 49/008; B23D 49/105; B23D 47/02; B23D 47/025; A44C 27/00
USPC ...... 411/144.1; 269/287, 288, 309, 289 MR, 269/71, 72, 57, 304
See application file for complete search history.

(56) References Cited

U.S. PATENT DOCUMENTS

| | | | | |
|---|---|---|---|---|
| 233,953 | A * | 11/1880 | Taylor ................. | B23Q 1/5412 269/74 |
| 1,958,203 | A * | 5/1934 | Pfau ...................... | B44B 3/061 144/24.05 |
| 2,660,079 | A * | 11/1953 | Bellows ................ | B25B 5/006 269/239 |
| 3,484,095 | A * | 12/1969 | Park ..................... | A44C 27/00 269/235 |
| 4,044,805 | A * | 8/1977 | Gronholz ............. | B23Q 1/4809 33/41.5 |
| 4,281,694 | A * | 8/1981 | Gorman ................ | B23Q 9/00 83/745 |
| 4,353,672 | A * | 10/1982 | Smith ................... | B23Q 9/00 144/144.1 |
| 4,549,727 | A * | 10/1985 | Kozar ................... | B23Q 16/04 269/93 |
| 4,698,475 | A * | 10/1987 | Lothenbach ......... | B23Q 7/1494 204/297.08 |
| 4,824,066 | A * | 4/1989 | Smith ................... | A61F 9/013 248/500 |
| 5,052,454 | A * | 10/1991 | Meinhardt ............ | B23Q 35/44 144/144.51 |

(Continued)

*Primary Examiner* — Jason L Vaughan
(74) *Attorney, Agent, or Firm* — Trevor T. Graves; Stites & Harbison PLLC

(57) ABSTRACT

A bench pin kit is provided for holding a metal to be sawed. The bench pin kit includes a bench pin, a retainer for removably fastening to the bench pin and a base for positioning within the retainer. The bench pin kit further includes an interchangeable sub plate for positioning within the base to hold the metal to be sawed and a top plate fastened to the base for overlying and securing the interchangeable sub plate.

20 Claims, 6 Drawing Sheets

(56) References Cited

U.S. PATENT DOCUMENTS

| | | | | |
|---|---|---|---|---|
| 5,094,279 | A * | 3/1992 | Dickey | B23Q 9/0078 |
| | | | | 144/144.1 |
| 5,513,594 | A * | 5/1996 | McClanahan | H01L 21/68735 |
| | | | | 269/254 R |
| 5,577,717 | A * | 11/1996 | Benson | B25B 5/06 |
| | | | | 269/254 R |
| 5,578,167 | A * | 11/1996 | Sooriakumar | H01L 21/67086 |
| | | | | 118/503 |
| 5,715,589 | A * | 2/1998 | Teague | B23Q 3/086 |
| | | | | 29/559 |
| 5,983,968 | A * | 11/1999 | Newman | B23Q 9/0078 |
| | | | | 144/144.1 |
| 11,173,624 | B2 * | 11/2021 | Hall | B27C 5/10 |
| 11,383,356 | B1 * | 7/2022 | Montilepre | B25B 5/109 |
| 11,433,465 | B2 * | 9/2022 | Hentz | B27B 9/04 |
| 12,343,810 | B1 * | 7/2025 | Capkovic | B23D 51/04 |
| 2003/0113180 | A1 * | 6/2003 | Schelberg | B23B 3/00 |
| | | | | 409/179 |
| 2003/0228200 | A1 * | 12/2003 | Talesky | B23Q 9/0021 |
| | | | | 409/179 |
| 2014/0060702 | A1 * | 3/2014 | Adkins | G01B 3/166 |
| | | | | 144/371 |
| 2021/0031333 | A1 * | 2/2021 | Hutchinson | B25B 5/04 |

\* cited by examiner

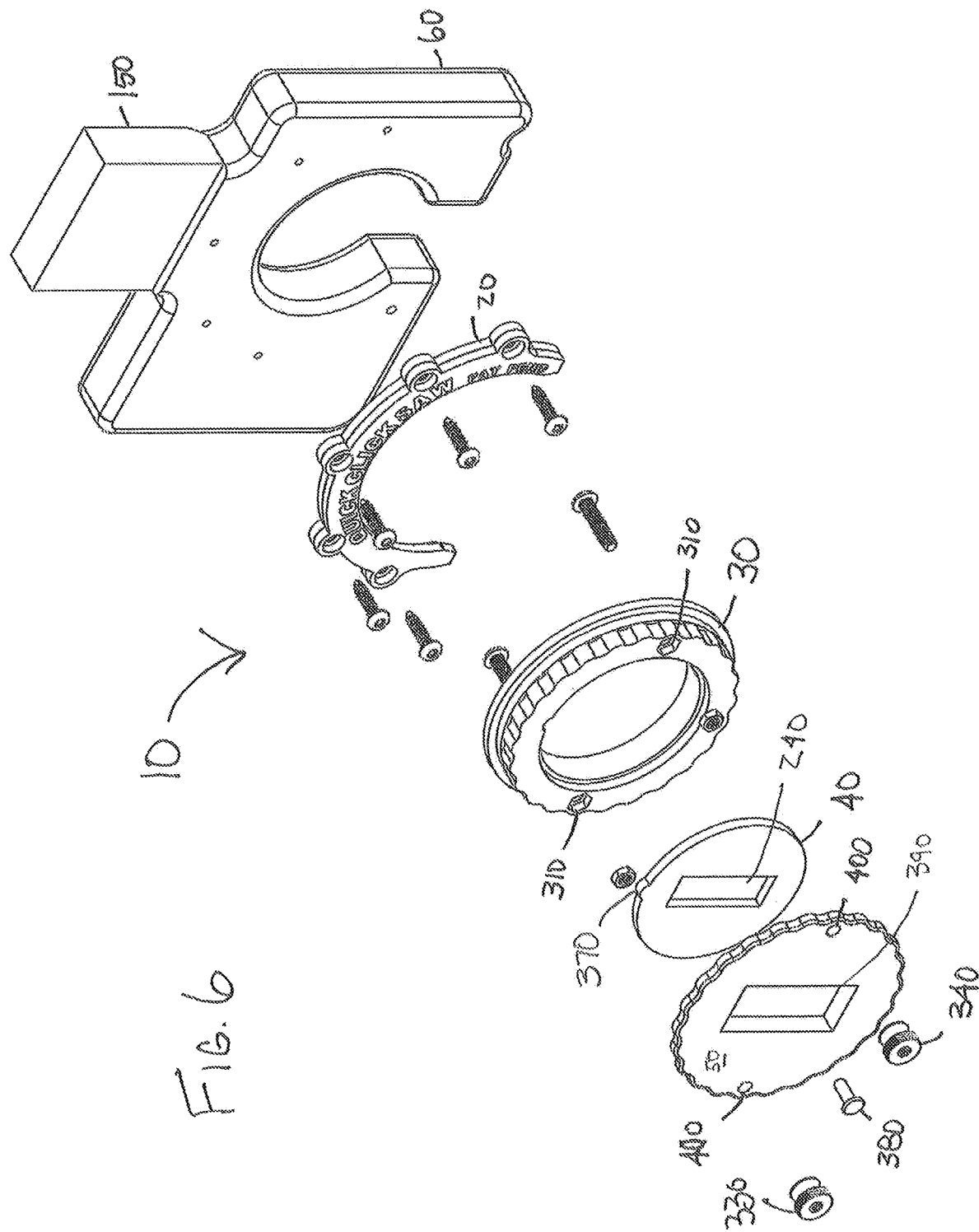

QUICK CLICK SAW ASSEMBLY

This application claims the benefit of U.S. Provisional Patent Application Ser. No. 63/329,088, filed on Apr. 8, 2022, the disclosure of which is incorporated herein by reference.

TECHNICAL FIELD

This disclosure relates generally to tools for manufacturing processes and, more particularly, to a bench pin system or a quick click saw assembly including a rotating clamp for holding a material such as sheet metal during sawing operations.

BACKGROUND

A metalsmith is a craftsperson that fashions, forms, or fabricates useful items, such as tools, wares and jewelry out of various metals, including precious metals, ferrous metals and nonferrous metals. One particular type of metalsmithing utilizes a saw, such as a jeweler's saw to cut various metals into jewelry. It is well known that a wide variety of different metals may be used in jewelry making. It is equally well known that these metals come in many sizes and shapes. Furthermore, it is desirable to saw these different types of metals coming in numerous shapes and sizes into many different pieces of jewelry, which come in a large variety of shapes and styles.

Traditionally, the piece of metal to be sawed is simply held by the individual with one hand during the sawing process, while the other hand performs the sawing operation. For intricate designs, the sawing process may take significant time, which can lead to hand fatigue, especially when both hands are being constantly utilized, i.e., one for holding and one for sawing. Moreover, the individual's fingers are quite close to the saw, which is disadvantageous for multiple reasons including safety concerns. For example, the fingers are put into a dangerous situation as they are extremely close to the saw blade and may be injured during sawing. Furthermore, if the individual draws a design in ink, pencil or marker on the item to be sawed, the fingers may rub off the design, which may result in a less precise design as the operator cannot see the design.

Accordingly, there is a need for an improved saw assembly to improve the efficiency of the sawing process for metals, such as jewelry. The improved saw assembly is designed to hold and lock the metal into place for the sawing process such that the individual performing does not need to use his hands to hold the piece of metal. As a result, the improved saw assembly offers more and improved control during the saw process and more and improved visibility of the piece to be sawed due to hands not being in the way. Furthermore, the improved saw assembly is able to hold nearly all types of metal regardless of size and shape. The improved saw assembly is also capable of being manipulated for use by operators that prefer to utilize their right hand to saw and operators that prefer to utilize their left hand to saw. The improved saw assembly is further capable of being utilized with interchangeable plates having different sizes for cutting different types and shapes of metal.

SUMMARY

In accordance with one aspect of the disclosure, a bench pin kit for holding a metal to be sawed is provided. The bench pin kit includes a bench pin, a retainer for removably fastening to the bench pin and a base for positioning within the retainer. The bench pin kit further includes an interchangeable sub plate for positioning within the base to hold the metal to be sawed and a top plate fastened to the base for overlying and securing the interchangeable sub plate.

In one possible embodiment, the bench pin includes a tongue configured to mount to a work bench. The bench pin may be made of a high-grade medium density fiberboard. The bench pin may include a pass-through slot connected to a center hole. The retainer may be substantially U-shaped. The retainer may be positioned over the center hole via one or more fasteners.

In another embodiment, the base may have a lower portion configured to fit within the retainer and an upper portion configured to receive the interchangeable sub plate. The lower and upper portion of the base define a circular opening extending through an entirety of the base. The interchangeable sub plate may be substantially circular and has a first opening in a center portion. The top plate may be substantially circular and has a corresponding opening in a center portion. The first and the corresponding opening have a same shape such that a window is created for viewing the metal to be sawed.

In accordance with another aspect of the disclosure, a system for use with a saw assembly is provided. The system includes a bench pin for mounting to a bench, a retainer connected to the bench pin, a circular base having a lower ring portion and an upper ring portion, wherein a hole extends through an entirety of the base. The system further includes a removable sub plate configured to fit within the upper ring portion of the circular base and a top plate connected to the circular base such that the removable sub plate is substantially covered.

In one possible embodiment, the retainer, base, sub plate and top plate are each made from a plastic material. The upper ring portion has wavy exterior edges. The top plate has corresponding wavy exterior edges matching the wavy exterior edges. A diameter of the lower ring portion may be greater than a diameter of the upper ring portion. The top plate may be connected to the base via one or more turn nuts. The removable sub plate engages a notch in the base. The system may also include a locking pin to further secure the base to the retainer.

In accordance with yet another aspect of the disclosure, a method of assembling a bench pin system for use in sawing jewelry is provided. The method includes providing a bench pin system including a bench pin, a retainer, a base, one or more interchangeable sub plate(s), and a top plate. The method further includes fastening the retainer above a key-shaped hole in the bench pin, locking the base to the retainer, positioning the one or more interchangeable sub plate(s) in a groove on the base, and placing the top plate over the one or more interchangeable sub plate(s) such that an opening in the one or more interchangeable sub plate(s) aligns with a corresponding opening in the top plate such that a metal to be sawed is visible in the opening.

BRIEF DESCRIPTION OF THE DRAWINGS

The accompanying drawings incorporated in and forming a part of the specification, illustrate several aspects of this disclosure, and together with the description serve to explain the principles of the disclosure. In the drawings:

FIG. 6 is an exploded unassembled side perspective view of the quick click saw assembly forming another aspect of this disclosure.

DETAILED DESCRIPTION

Figure 1:
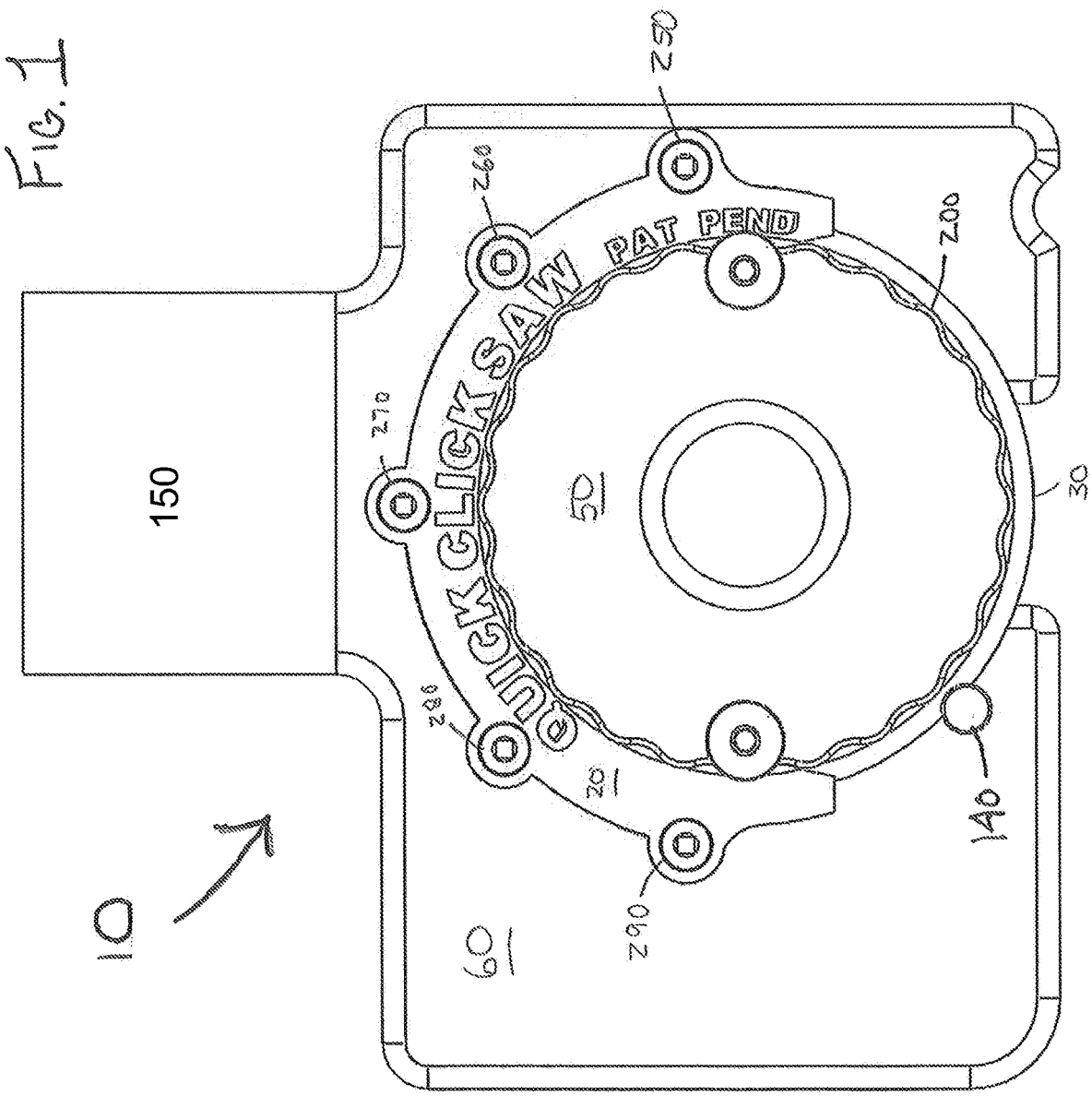
FIG. 1 is an assembled top view of a quick click saw assembly forming one aspect of this disclosure.

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the invention is defined only by the appended claims and their equivalents. In accordance with the disclosure, a bench pin system also known as a quick click saw assembly is hereinafter described.

Reference is now made to FIGS. 1-6, which illustrate a bench pin system or a quick click saw assembly 10 for holding metals in sawing operations, such as jewelry piercing and jewelry making. The quick click saw assembly 10 may include a retainer 20, a base 30, one or more interchangeable sub plates 40, a top plate 50 and a bench pin 60. The retainer 20, base 30, sub plates 40 and top plate 50 may be made from a durable plastic, such as polyethylene terephthalate glycol (PETG). Traditionally, the piece of metal to be sawed is held down with the individual's fingers and the piece is turned to follow the pattern to be sawed. In this way, the piece of metal is simply "floating," i.e., the metal piece to be sawed is not fixed, which is disadvantageous for obvious reasons. The quick click saw assembly locks metal into place so the individual performing the sawing does not need to use their hands to hold the metal piece.

In one embodiment described herein, the quick click saw assembly 10 allows the saw material to be held in place and the individual may rotate the pattern on a fixed circle. For example, the top plate 50 may have a pattern set to random locations on the X and Y axis relative to the saw's position and the part to be sawed is rotated to cut the pattern. The saw stroke would be on the Z axis, i.e., up and down based on the computer numerical control (CNC) mills of X-Y-Z travels on them.

The quick click saw assembly 10 may include a CNC milled bench pin 60, which may be manufactured via CNC wood router cut out of maple hardwood with a pass-through slot 70 for the saw blade and a large center hole 80 connecting to the slot 70 to accommodate various sizes of the material to be sawed. The bench pin 60 may also be manufactured from a high-grade medium density fiberboard (MDF). In the illustrated embodiment, the bench pin 60 is substantially rectangular-shaped with rounded edges for increased comfort for the operator during sawing operations.

A plurality of mounting holes for the retainer 20 are made in the bench pin 60. In the embodiment illustrated, there are five (5) mounting holes 90, 100, 110, 120, and 130, but it should be appreciated that there may be more or less mounting holes may be utilized. The mounting holes are spaced evenly around top of the hole 80. Furthermore, there may be a lock out pin hole 140 to prevent the base 30 from being able to be removed from the bench pin 60. A tongue 150 on the back side of the bench pin 60 is configured to fit most pre-made receivers mounted to a work bench (not shown) with the option to screw or mount to the bench top or to another bench pin etc. Alternatively, if an operator prefers to cut on angled pins, the quick click saw assembly 10 may mount to the angled pins. In another embodiment, the tongue 150 may be attached to an arm support to further assist the operator. In the illustrated embodiments, the tongue 150 is substantially rectangular-shaped, but other shapes may be utilized. The bench pin 60 may be configured for either a left-hand or a right-hand operator.

The retainer 20 or "click retainer" may be removably mounted to the bench pin 60 with a plurality of fasteners. In the illustrated embodiment, the retainer 20 is substantially U-shaped with a plurality of holes 250, 260, 270, 280, and 290 that correspond equally to the number of mounting holes on the bench pin 60. For example, in the illustrated embodiment, five fasteners are utilized to securely hold the retainer 20 in place on the bench pin 60. The five fasteners may be stainless steel screws 160, although other fasteners manufactured from different materials may also be used. Specifically, the retainer 20 is positioned on the bench pin 60 such that it borders the large center hole 80 in the bench pin 60. The opening pinch point creates the unique "click" locking in of the base 30 (discussed in more detail below) while allowing it to rotate with exceptional control during sawing operations.

The base 30 is substantially circular with a large hole cut through an entirety of the center. The base 30 has a lower ring 170 that fits within the retainer 20. The base 30 has an upper ring 180 positioned on top of the lower ring, wherein the upper ring has wavy outer edges for finger grip. The diameter of the lower ring 170 is greater than the diameter of the upper ring 180. Fasteners, such as a pair of stainless steel screws 300 pass through counter bore holes 310 and are held in place by the incorporated built-in hex 320 to hold the nut. This provides the ability to hold the top plate 50 down with the brass thumb turn nuts 330, 340. In other words, the screws 300 pass thought the base into the top plate 50 and are secured by the brass thumb turn nuts 330, 340. The top face of the base 30 has a small notch or groove 360 that is engaged by the sub plate 40.

Figure 2:
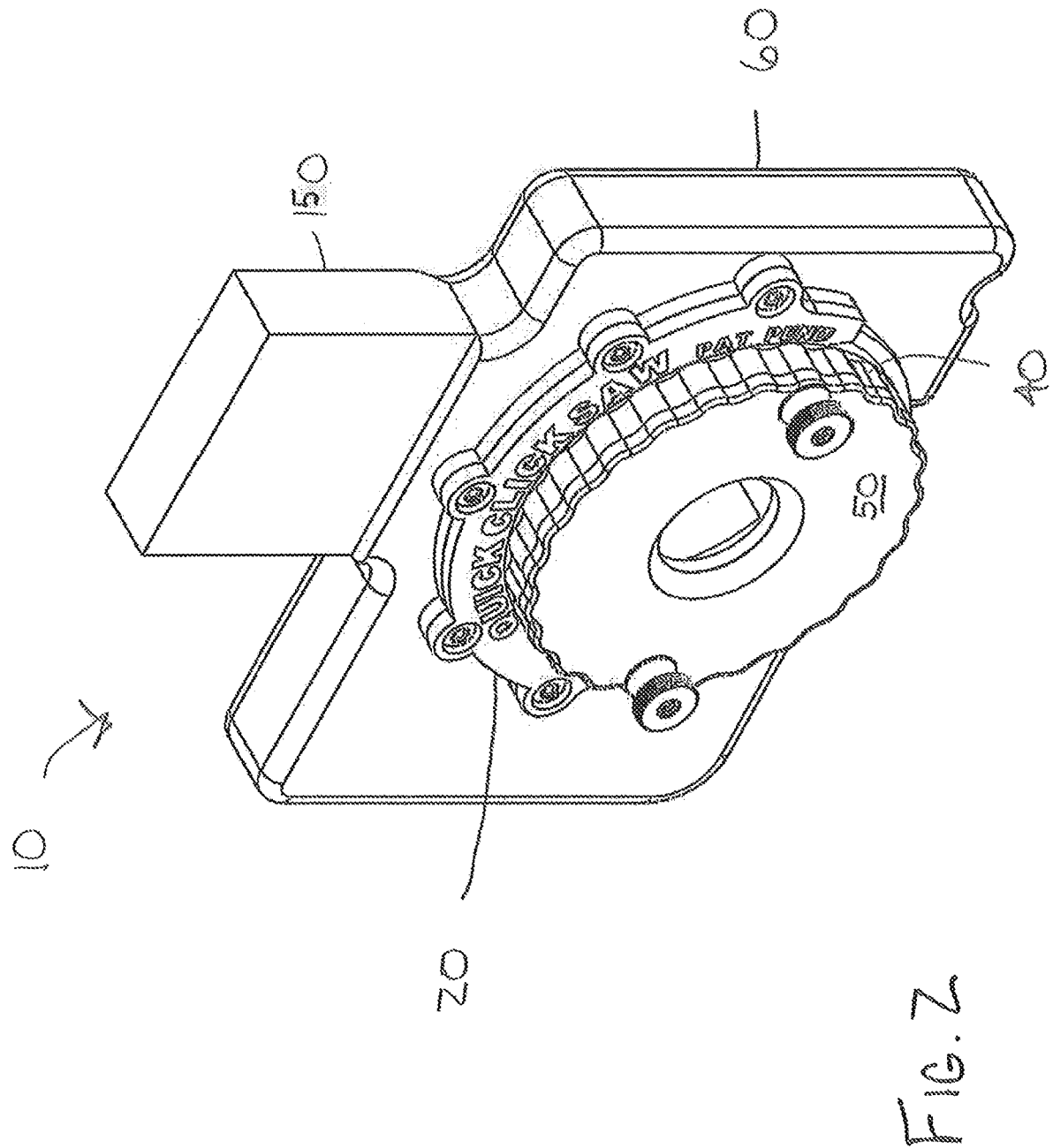
FIG. 2 is an assembled top perspective view of the quick click saw assembly forming one aspect of this disclosure.
Figure 3:
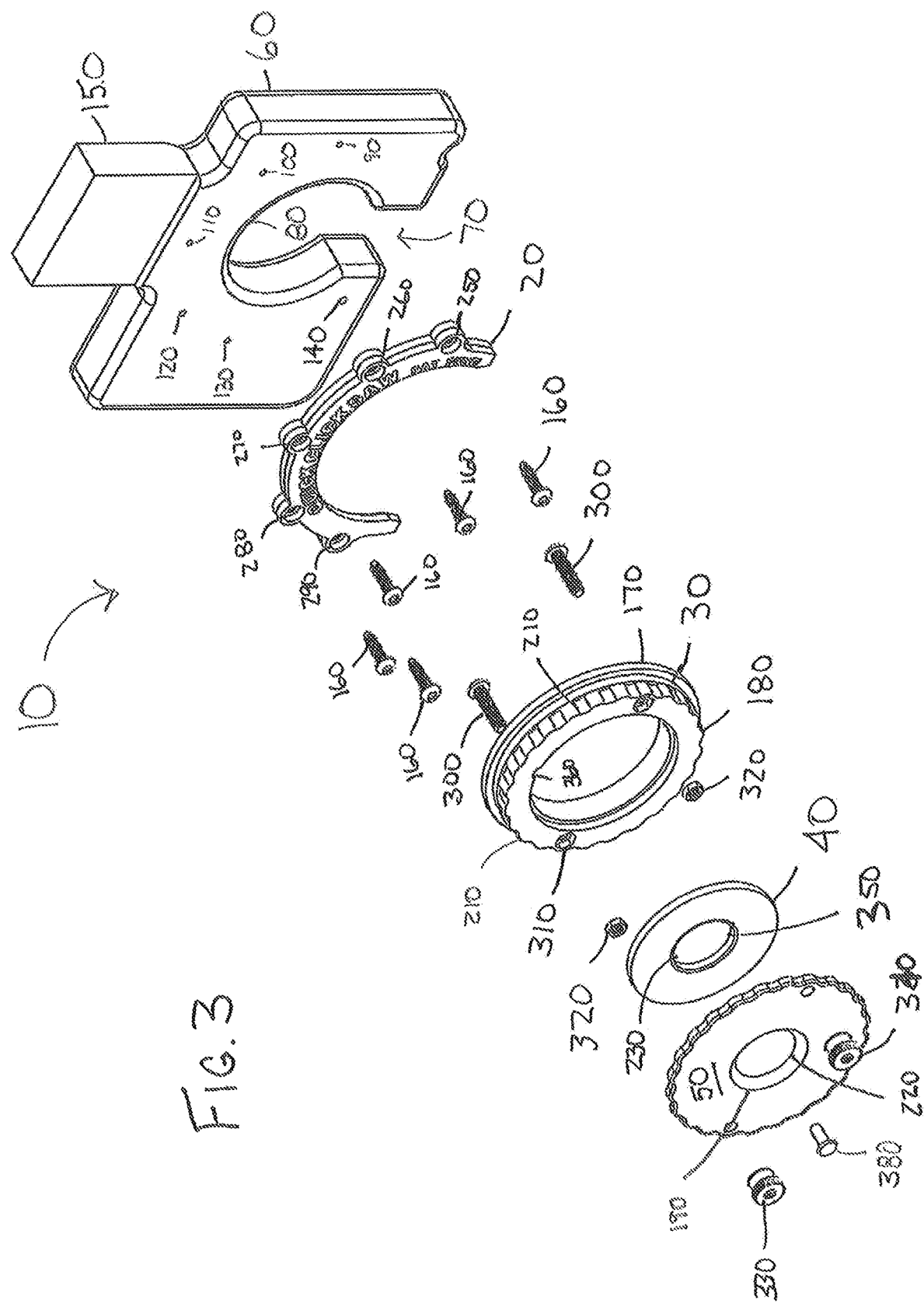
FIG. 3 is an exploded unassembled side perspective view of the quick click saw assembly forming one aspect of this disclosure.
Figure 4:
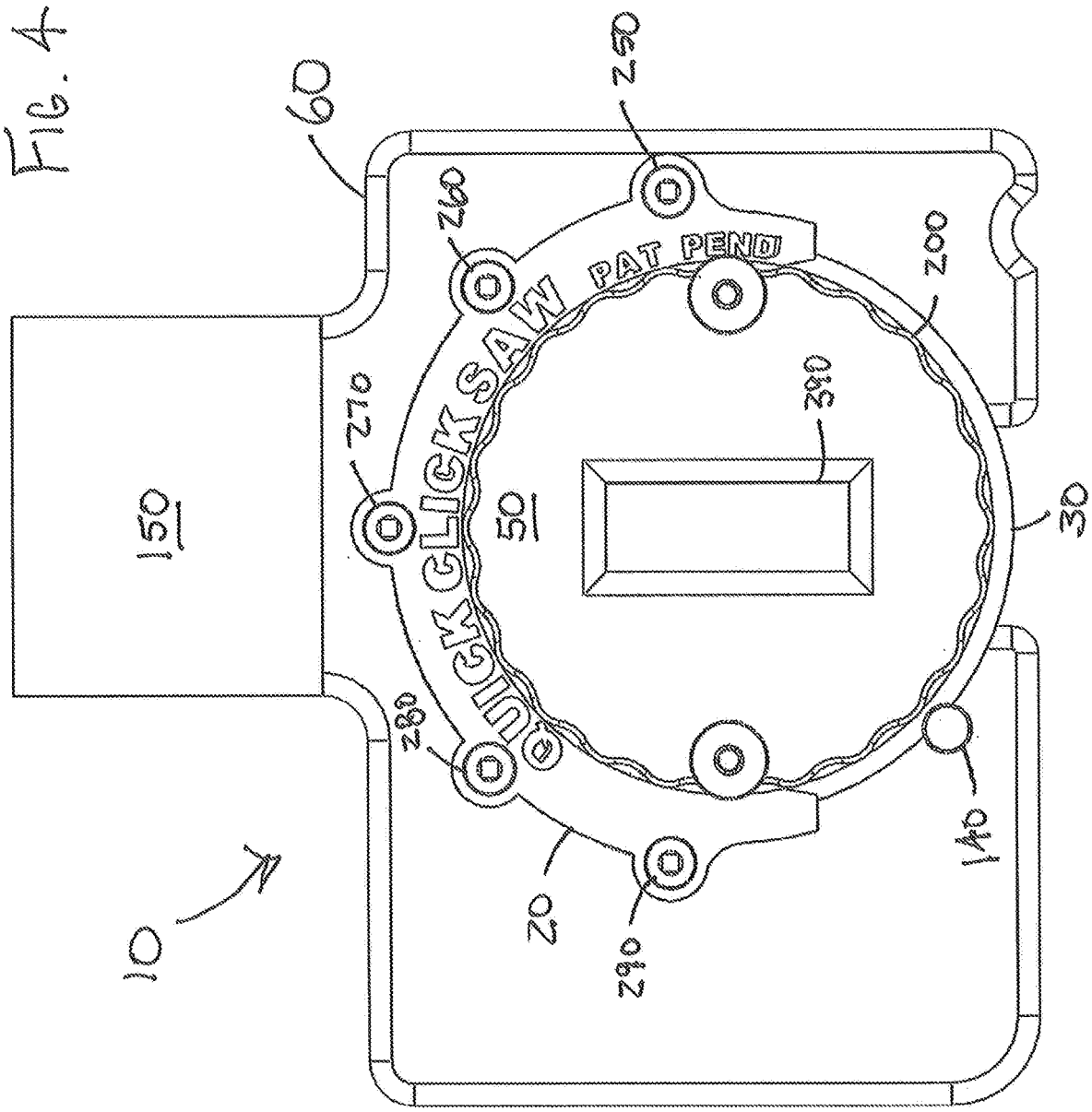
FIG. 4 is an assembled top view of a quick click saw assembly forming another aspect of this disclosure.
Figure 5:
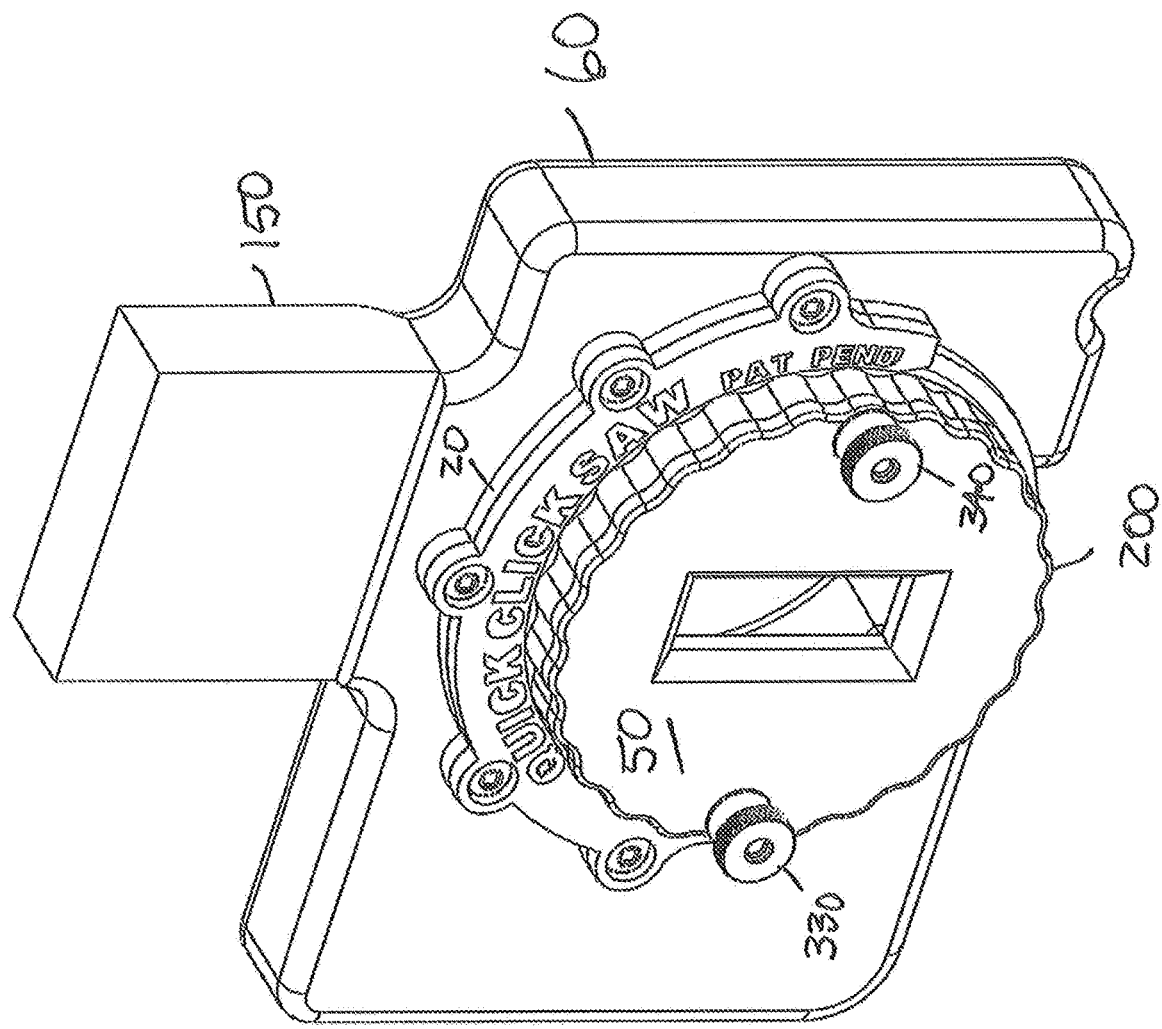
FIG. 5 is an assembled top perspective view of the quick click saw assembly forming another aspect of this disclosure.

A plurality of interchangeable sub plates 40 may be used with the quick click saw assembly 10. For example, there may be any size sub plate 40 from ⅜ inches diameter up to a maximum diameter of 2 inches. Each sub plate 40 has an opening having a shallow counter bore 350, which may be approximately 0.013 thousand deep to locate the disk in center and matches the corresponding counter bore 220 in the top plate 50. The opening may be circular 230 (as shown in FIGS. 1-3) or rectangular 240 (as shown in FIGS. 4-6). The sub plate 40 with a rectangular shape has a notch 370 to engage with the notch 360 of the base 30. In use, the sub plate is positioned on a groove in the hole of the base 30 and over the hole extending through the bench pin 60. Different sub plates are easily interchangeable for use with the quick click saw assembly, i.e., "quick to change" depending on the size of the piece of metal the individual is sawing from one piece to another piece. It should be appreciated that the quick click saw assembly 10 is not limited to cutting round disk, but can also accommodate flat rectangle and square sheets, hearts, etc.

An operator may choose either the circular opening 230 in the sub plate or the rectangular opening 240 in the sub plate based on different factors. For example, the rectangular opening allows for better cutting of O/D patterns. The rectangular opening is also preferable for use in holding ring shanks. Advantageously, the sub palate with the rectangular opening has the notch to match with the notch in the base. On the other hand, the circular opening 230 may be best used for pre-stamped metal disks, which fit within the circular opening for sawing operations.

The top plate 50 is substantially circular and has an opening in its center. The opening may be circular 190 (as shown in FIGS. 1-3) or rectangular 390 (as shown in FIGS. 4-6). The opening shall be the same as the one used with the sub plate 40. The top plate 50 incorporates matching wavy outer edges 200 for finger grip corresponding to wavy outer edges 210 of the base 30. Using the matching top plate 50 to a matching sub plate 40, one can hold down the chosen matching metal disk, i.e., the piece to be sawed. As discussed above, the top plate 50 is held in place to the center and the wavy finger grips via fasteners, such as the two screws 300 extending through the base 30 and into two corresponding holes 400 in the top plate 50. The top plate 50 is locked down with the two brass thumb turn nuts 330, 340 that may be finger tightened to secure the top plate 50 to the base 30 with the sub plate 40 positioned within the base 30 and below the top plate 50. It should be appreciated that the top plate 50 has a focal angle for the circular center portion to improve visual inspection of the piece to be sawed. Namely, at 90 degrees, the individual performing the sawing vision may be impaired with respect to the pattern, but when the angle of the circular center is tapered, it tends to draw the eyes in to focus on the pattern.

Once an individual feeds the saw blade through the part and loaded it into the retainer 70, they have the option of using a locking pin 380 to prevent the base 30 from accidently being pulled from the retainer 70. The locking pin 380 is optional as it provides additional safeguards in keeping the base in place. When locked into place, the base 30 prevents undesirable vertical lifting.

The foregoing descriptions of various embodiments have been presented for purposes of illustration and description. These descriptions are not intended to be exhaustive or to limit the invention to the precise forms disclosed. The embodiments described provide the best illustration of the inventive principles and their practical applications to thereby enable one of ordinary skill in the art to utilize the disclosure in various embodiments and with various modifications as are suited to the particular use contemplated.

The invention claimed is:

1. A bench pin kit for holding a metal to be sawed, comprising:
a bench pin;
a retainer for removably fastening to the bench pin;
a base for positioning within the retainer;
an interchangeable sub plate for positioning within the base to hold the metal to be sawed; and
a top plate fastened to the base for overlying and securing the interchangeable sub plate.

2. The bench pin kit according to claim 1, wherein the bench pin includes a tongue configured to mount to a work bench.

3. The bench pin kit according to claim 1, wherein the bench pin is made of a high-grade medium density fiberboard.

4. The bench pin kit according to claim 1, wherein the bench pin includes a pass-through slot connected to a center hole.

5. The bench pin kit according to claim 1, wherein the retainer is substantially U-shaped.

6. The bench pin kit according to claim 1, wherein the retainer is positioned over the center hole via one or more fasteners.

7. The bench pin kit according to claim 1, wherein the base has a lower portion configured to fit within the retainer and an upper portion configured to receive the interchangeable sub plate.

8. The bench pin kit according to claim 1, wherein the lower and upper portion of the base define a circular opening extending through an entirety of the base.

9. The bench pin kit according to claim 1, wherein the interchangeable sub plate is substantially circular and has a first opening in a center portion.

10. The bench pin kit according to claim 1, wherein the top plate is substantially circular and has a corresponding opening in a center portion.

11. The bench pin kit according to claim 10, wherein the first and the corresponding opening have a same shape such that a window is created for viewing the metal to be sawed.

12. A system for use with a saw assembly, comprising:
a bench pin for mounting to a bench;
a retainer connected to the bench pin;
a circular base having a lower ring portion and an upper ring portion, wherein a hole extends through an entirety of the base;
a removable sub plate configured to fit within the upper ring portion of the circular base; and
a top plate connected to the circular base such that the removable sub plate is substantially covered.

13. The system according to claim 12, wherein the retainer, base, sub plate and top plate are each made from a plastic material.

14. The system according to claim 12, wherein the upper ring portion has wavy exterior edges.

15. The system according to claim 14, wherein the top plate has corresponding wavy exterior edges matching the wavy exterior edges.

16. The system according to claim 12, wherein a diameter of the lower ring portion is greater than a diameter of the upper ring portion.

17. The system according to claim 12, wherein the top plate is connected to the base via one or more turn nuts.

18. The system according to claim 12, wherein the removable sub plate engages a notch in the base.

19. The system according to claim 12, further comprising a locking pin to further secure the base to the retainer.

20. A method of assembling a bench pin system for use in sawing jewelry, comprising:
providing a bench pin system including a bench pin, a retainer, a base, one or more interchangeable sub plate (s), and a top plate;
fastening the retainer above a key-shaped hole in the bench pin;
locking the base to the retainer;
positioning the one or more interchangeable sub plate(s) in a groove on the base; and
placing the top plate over the one or more interchangeable sub plate(s) such that an opening in the one or more interchangeable sub plate(s) aligns with a corresponding opening in the top plate such that a metal to be sawed is visible in the opening.

* * * * *